Oct. 28, 1941. P. R. FAIRBANKS 2,261,099
TAIL GATE CONTROL
Filed April 11, 1940 2 Sheets-Sheet 2
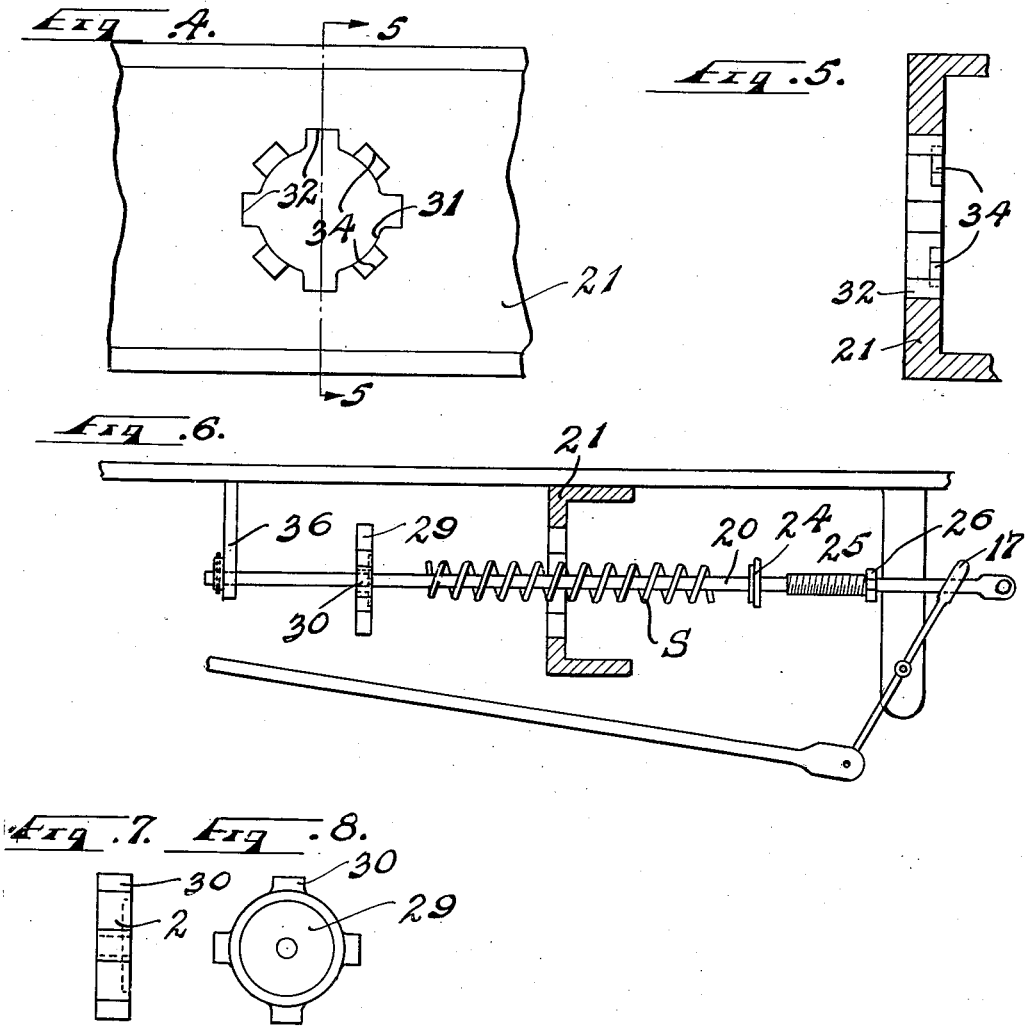
Inventor
Philip R. Fairbanks
By P. M. Thomas
Attorney Patented Oct. 28, 1941

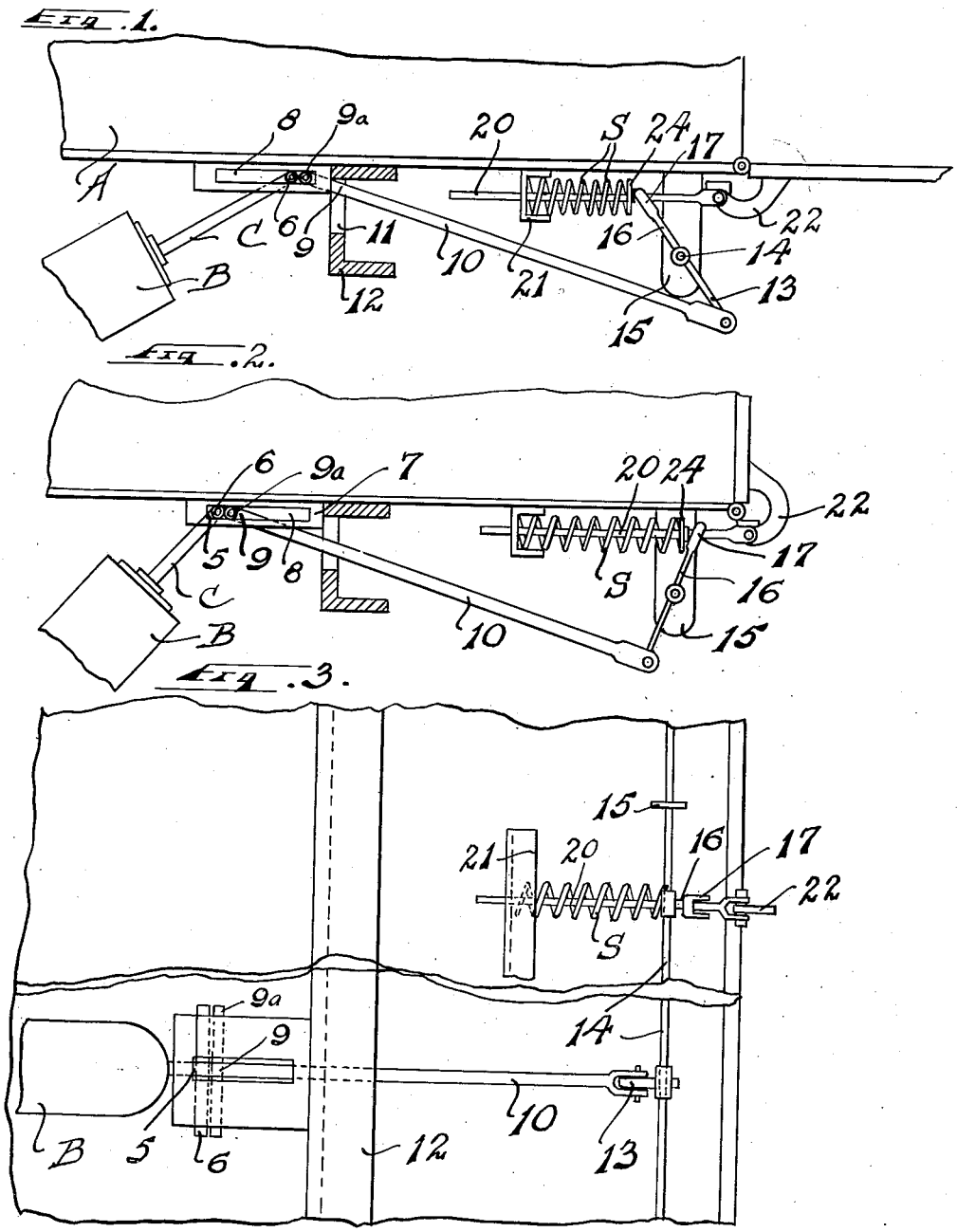

2,261,099

UNITED STATES PATENT OFFICE 2,261,099

TAIL GATE CONTROL

Philip R. Fairbanks, Ogden, Utah

Application April 11, 1940, Serial No. 329,185

4 Claims. (Cl. 298—23)

My invention relates to tail gates for dump trucks and the like and has for its object to provide a tail gate which will automatically open with action of the dump body elevating mechanism or hydraulic jack used for the purpose.

A further object is to provide a tail gate control mechanism which will open the gate before the body has been raised and close it after the body has lowered to horizontal position without any undue stress or expensive machinery.

A further object is to provide a device which will permit the tail gate to be struck by any obstacle either when closed or open or at any intermediate position and the gate will yield sufficiently to prevent any breakage and should the obstacle be removed the gate will close when the body resumes a horizontal or rather a parallel position relative to the bed member.

A still further object is to provide a control for the lock of the dump body tail gate connected to and operative in unison with the opening and closing of the tail gate relative to the position of the dump bed and elevating mechanism.

These objects I accomplish with the device illustrated in the accompanying drawings in which similar numerals and letters of reference indicate like parts throughout the several views and described in the specification forming a part of this application and pointed out in the appended claims.

In the drawings,

Figure 1 is a view of the rear end of a dump truck body for trucks showing the tail gate opened prior to dumping of the load, parts cut away.

Figure 2 shows the same view with the tail gate closed.

Figure 3 is an inverted plan view of Figure 2.

Figure 4 shows a face view of the support spring stop for the spring control, showing the recessing for the spring rod guide.

Figure 5 is a section on line 5—5 of Figure 4.

Figure 6 is a view of the spring control for the tail gate, with the spring tension release as it would be when disengaged from the tail gate for non-use.

Figure 7 is a side view of the rod guide and spring stop.

Figure 8 is a face view of the spring rod guide.

The main feature of this invention is that the tail gate is opened before the dump body is elevated and is not closed until after the dump body has been returned to its initial position.

In the drawings I have shown several modifications of devices for accomplishing these purposes which mainly are all operated by spring tensioned control rods controlling the position of the tail gate. In the drawings Figures 1 to 8 showing embodiment of my invention in which the dump body A is controlled by the usual hydraulic lifting jack B but which has the piston rod C provided with a T-shaped end 5 which T is provided with rollers 6 along the head of the T, said rollers operating in an elongated slotted bearing block 7. The slot 8 in which the rollers 6 operate also carriers rollers 9a on the T-head 9 of a control shaft 10. The shaft 10 passes through a slot 11 in one of the cross braces 12 of the dump body A and the forward end of the shaft is bifurcated and engaged over the lower end of a depending lever 13. This lever 13 is attached to a cross bar 14 mounted across under the end of the dump truck body A in bearing brackets 15 and the lever is preferably in the center of the bar 14. Spaced on each side of the lever 13 and extending diametrically opposite thereto I provide spaced apart actuating levers 16 each of which has the top end bifurcated at 17 to operate alongside or over the main gate control rods 20. These rods 20 are mounted with the rear end passed through a bearing bracket 21 and with the other end bifurcated and pivotally secured to the tail gate levers 22. These levers are formed arc-shaped with their ends rigidly secured to and for the purpose of operating the tail gate. A tension spring S is carried on the control rods 20 between the bracket 21 and an adjustable collar or perforated plate 24. This plate is either internally threaded to fit threads 25 on the rod or provided with a set screw for adjustment of the position of the plate or may ride freely on the rod in some instances. An adjusting lock nut 26 is screwed onto the threads 25 to lock the collar 24 in position as desired. The outside surface of the collar is engaged by the forked end 17 of the actuating levers 16. When the device is operated the forks 17 engage the collars 24 forcing the rods 20 longitudinally causing the arc levers 22 to open the tail gate. Dirt or muck will open the gate when spring tension is removed when the collar is allowed to ride freely on the shaft. When the body is lowered the tension of the compressed spring S forces the tail gate back into position by longitudinal movement of the rods 20.

In Figures 4 to 8 I have shown a method of permitting quick release of the tail gate control in the event it is not desired. This is done by a spring stop and rod guide plate 29 having extended lugs 30 on four sides thereof and adapted to fit in a hole 31 in the bracket 21 said guide plate and hole being formed identical in shape so that when the fingers 30 are in alignment with the grooves 32 in the hole the plate 29 will pass through the hole 31 but will be so formed that when rotated slightly the fingers 30 will fit into recesses 34 in the face of the bracket as shown clearly in Figures 4 and 5. The rear end of the rod may be passed through a guide bracket 36 if desired and a lock pin may be mounted through the rod to lock the rod disengaged, but this slight detail is not thought to be essential parts of the invention.

The operation of this particular modification of the invention is such that when lifting jack is actuated the head 5 engages the head 9 and as the jack is actuated the heads force the shaft 10 longitudinally which in turn moves the lever 13 forward partially rotating the cross bar 14, which causes the fork 17 to engage the collar 24 compressing the spring S and permitting the tail gate to open down to an open position shown in Figure 1. When the truck bed is empty and has been returned to a horizontal position, the release of the shaft 10 by the rod C of the jack, permits the spring S to return the gate to the closed position shown in Figure 2 and returns the head 5 to the original position.

Having thus described my invention I desire to secure by Letters Patent and claim:

1. In a tail gate control for dump truck bodies which include body elevating mechanism the combination of a tail gate having depending levers by which it is opened and closed; horizontal control rods mounted with one end engaged with the free ends of said levers and the other end passed through a rod guide; a transverse cross bar mounted across under said control rods; levers extending up from said cross bar having their ends bifurcated with one of the control rods disposed between the bifurcated ends of each lever; a spring plate carried adjustably on each of said control rods against which the bifurcated ends of the levers engage; a depending lever extending from said cross bar; and means to actuate said depending lever by the movement of the elevating mechanism for the dump truck body to open and close the tail gate.

2. A device as set forth in claim 1 in which the elevating mechanism for the dump truck body comprises an hydraulic jack.

3. A tail gate control for dump truck bodies comprising a truck body and an hydraulic jack; a tail gate pivotally mounted in the open end of said body and having depending levers by which the tail gate is opened and closed; control rods attached to said levers; springs controlling said rods to close the tail gate; and means operated by the hydraulic jack to compress said springs and to open the tail gate with each lifting movement of the hydraulic jack for dumping the load from the truck body.

4. A tail gate control for a dump truck body, which is tilted by hydraulic mechanism, comprising a tail gate pivoted to the body; a set of depending levers fixed on said gate; a horizontally mounted crank member mounted on the body and engaging said levers to actuate said levers to open the tail gate when rotated in one direction; and means to rotate said crank member by the hydraulic elevating mechanism of the truck body when operating to tilt the body.

PHILIP R. FAIRBANKS.